May 30, 1939.     J. F. WINKLER     2,160,187
AIR AND COMBUSTION PRODUCTS RECOVERY SYSTEM AND APPARATUS THEREFOR
Filed Oct. 9, 1937
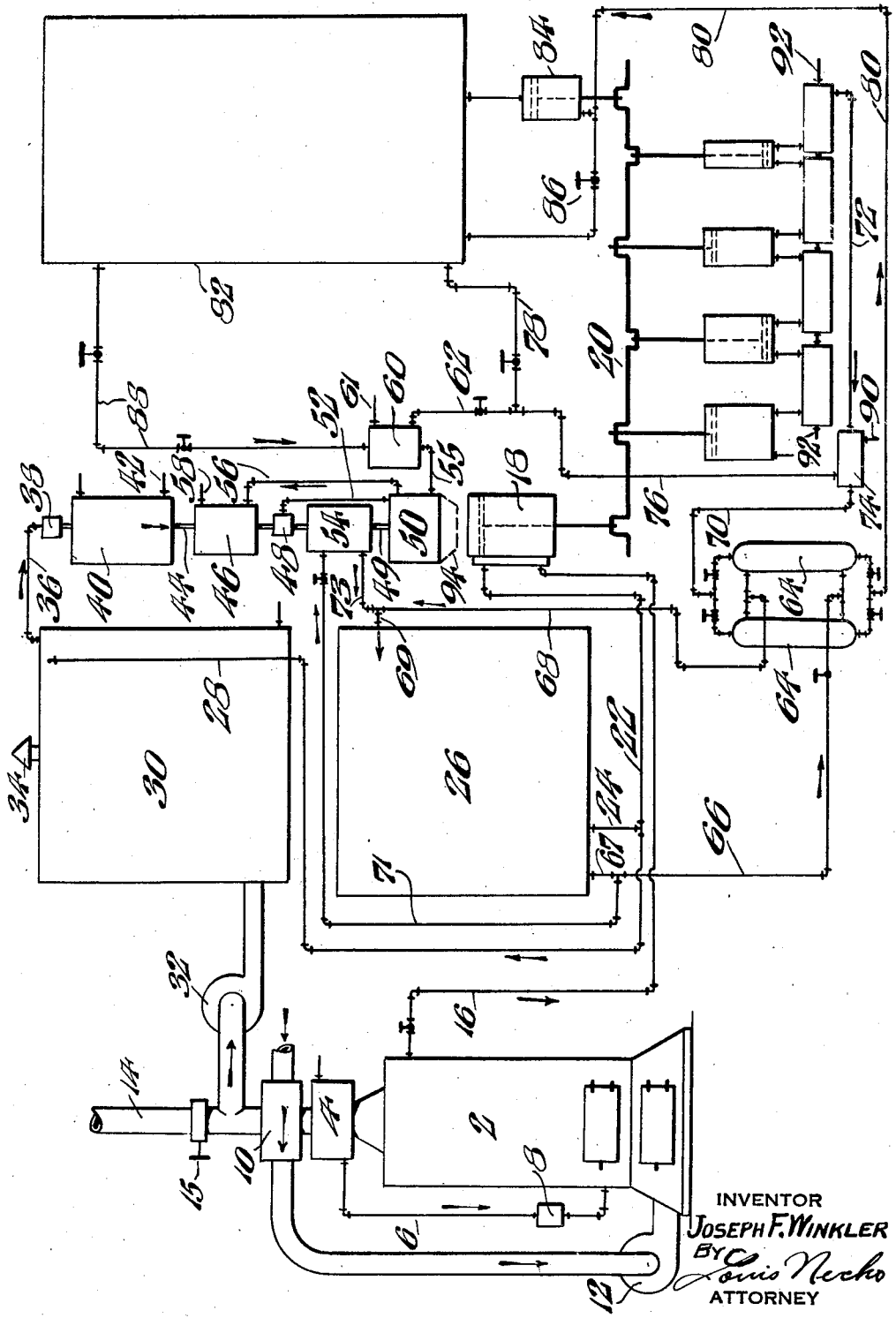
INVENTOR
JOSEPH F. WINKLER
BY Louis Necho
ATTORNEY Patented May 30, 1939

2,160,187

UNITED STATES PATENT OFFICE 2,160,187

AIR AND COMBUSTION PRODUCTS RECOVERY SYSTEM AND APPARATUS THEREFOR

Joseph F. Winkler, Philadelphia, Pa.

Application October 9, 1937, Serial No. 168,194

6 Claims. (Cl. 62—121)

My invention relates to a new and useful air and combustion products recovery system and apparatus and it relates more particularly to a novel combination and interconnection of the various units of the apparatus whereby solidified carbon dioxide gas, liquid air, liquid oxygen, liquid nitrogen, and very cold gaseous oxygen are all simultaneously produced at greatly reduced costs of initial material as well as of operation.

My invention still further relates to a system and apparatus whereby, from approximately a ton of fuel such as "Bunker C #6" fuel oil or its equivalent, I am able to produce at least one ton of solid carbon dioxide and at least one ton of liquid oxygen and still have extra power for other requirements or for collateral, mechanical refrigeration which can be used for the manufacture of ordinary water ice or other refrigerating purposes.

Heretofore, as far as I am aware, liquid oxygen or solid carbon dioxide or liquid air have been produced separately by means of independent, complicated and relatively expensive different sets of apparatus which were not only expensive to construct but which also required the expenditure of large amounts of power.

More specifically, as far as I am aware, solidified carbon dioxide was produced by cooling and compressing the carbon dioxide gas into a liquid state under high compression and cooled to a relatively speaking small extent, the actual solidification of the carbon dioxide taking place when the pressure was relieved so that the sudden evaporation during expansion resulted in the formation of carbon dioxide "snow". Aside from the fact that such a method necessitated expensive apparatus in exerting the necessary pressure, the solidified carbon dioxide produced suffered an increase in temperature so that the finished product was not as cold as it might have been had the carbon dioxide gas been solidified by external means and without permitting the liquid $CO_2$ mass first to evaporate.

It is therefore a specific object of my invention to produce a system and apparatus whereby $CO_2$ gas can be solidified at approximately atmospheric pressure by an external reagent which in itself is produced economically as a by-product of my novel system and apparatus.

A further object of my invention is to produce liquid or gaseous oxygen at comparatively low cost by very greatly pre-cooling the air as it passes through a conventional multi-stage air compressor thus greatly reducing the power requirements, the pre-cooling of the air being again effected by efficient utilization of the power initially produced.

My invention still further relates to a heat exchange system and apparatus in which, not only the power of the fuel consumed is efficiently utilized to carry on the processes outlined, but in which the $CO_2$ is reclaimed directly from the gases resulting from the combustion of the fuel.

Other novel features of advantage and construction will be more clearly understood from the following specification in connection with the accompanying drawing which represents diagrammatically the heat exchange system and apparatus forming the subject matter of my invention.

In carrying out my invention I utilize a conventional steam boiler 2 having the water pre-heater 4 which communicates with the boiler 2 through the pipe 6 and the pump 8. 10 designates an air heater for pre-heating the air before it is delivered into the combustion chamber by the blower 12. The stack 14 is provided with the shut-off valve 15. The steam from the boiler 2 is conducted through the pipe 16 to the conventional steam engine 18 which drives the multi-stage air compressor 20. The partly spent steam from the engine 18 is delivered through the pipe 22 and the by-pass 24 to any suitable multi-stage mechanical refrigerating mechanism 26 and is also fed through the pipe 28 into the mechanism 30 which absorbs $CO_2$ from the products of combustion which are delivered to said mechanism 30 by the blower 32. The mechanical refrigerating system 26 may be of any desired multi-stage type, and, since such constructions are now on the market, it is not deemed necessary to show or describe them in further detail. The $CO_2$ separating mechanism 30 is also of a multi-stage conventional construction in which, for instance, a potassium hydroxide solution or the like is used to absorb the $CO_2$, and which permits the other impurities which are not absorbed to escape through the exhaust 34. The $CO_2$ absorbed in the solution is boiled off by means of the heat supplied from the secondary steam delivered through the pipe 28 and is fed through the pipe 36 and through the compressor 38 to the cooler, drier and purifier 40 which is preferably water cooled by water circulating through the pipes 42. From the cooler, drier and purifier 40 the $CO_2$ passes through the pipe 44 into a secondary cooler 46 where the $CO_2$ is further cooled by nitrogen gas which is partly spent as to its refrigerating capacity, and the source of which will hereinafter be further described. 48 designates a compensating compressor for maintaining a balanced pressure in the $CO_2$ solidifying chamber 50, it being noted that the compensating compressor 48 communicates with the chamber 50 through the by-pass 52. From the compressor 48 the $CO_2$ enters the cooling chamber 54 which is cooled by means of the mechanical refrigerating unit 26 operated by the partly spent steam from the steam engine 18 in the manner above set forth. From the chamber 54 the $CO_2$ enters the chamber 50 through the pipe 49. The solidification chamber 50 is refrigerated by means of nitrogen which enters it through the pipe 55 and, after the nitrogen has absorbed some heat from the chamber 50 so that it is not as cold as it was initially, it is conducted through the pipe 56 to pre-cool the $CO_2$ in the chamber 46, from which the completely spent nitrogen emerges through the outlet 58 to the atmosphere. If the nitrogen supplied to the pipe 55 from the chamber 60 is not sufficiently cold, it may be further cooled by liquid oxygen supplied through the pipe 62.

The air compressor 20 operated by the steam engine 18 delivers the compressed air to one or the other of the air drying and cooling units 64 which, it will be noted, communicate with the refrigerating mechanism 26 through the pipe 66 and with the refrigerating chamber 54 through the pipe 68. The air from the compressor 20 may be delivered to the air cooler 64 through the pipe 70 which may communicate with the pipe 72 directly to the compressor or which may communicate with the compressor and the pipe 72 through the auxiliary cooling chamber 74, the latter being supplied, if in use, with liquid oxygen through the pipe 76 which, as will be seen, communicates with the pipe 78 which feeds liquid oxygen to the pipe 62 and chamber 60 above mentioned. The chamber 60 is provided with the outlet 61 from which the oxygen gas, the refrigerating capacity of which has been spent, may be exhausted to the atmosphere or collected into another receptacle, not shown, for further use as oxygen gas. The compressed, cooled air leaves the cooler 64 through the pipe 80 to enter a conventional liquid air machine 82 through the expander engine 84 and/or the expansion valve 86, it being noted that the expander engine 84 is operated, together with the air compressor 20, by the steam engine 18. Since any desired type of liquid air machine involving heat exchange elements and means for separating liquid oxygen from very cold nitrogen gas may be employed, it is not deemed necessary to show the details of such liquid air machine. From the liquid air machine 82 emerges the pipe 88 which delivers cold nitrogen gas through the chamber 60 in the pipe 55 to the $CO_2$ solidification chamber 50. If, due to variation or other reasons, it is desired further to cool the nitrogen gas, some liquid oxygen from the liquid air machine 82 may be delivered through the pipes 78 and 62. Similarly, as previously stated, liquid oxygen can be drawn through the pipes 78 and 76 to refrigerate the compressed air in the chamber 74. From the chamber 74 the oxygen gas can be exhausted to the atmosphere or collected for further use through the outlet 90. The liquid air compressor is pre-cooled by water circulating through the pipes 92.

The $CO_2$, when cooled by water in the chamber 40, is brought down to about 70° F. and is further cooled in the refrigerating chamber 54 to about minus 70° F. after which, in the solidification chamber 50, the $CO_2$ is subject to the action of nitrogen gas of a temperature approximately minus 250° F. The $CO_2$ is solidified in the chamber 50 at approximately atmospheric pressure thus permitting the opening of the doors 94 of the chamber 50 for removal of the $CO_2$ snow to a packing machine without violence or scattering or other waste. By refrigerating the air at 64 and/or 74, the power necessary to compress the air is greatly reduced so that the power produced by the steam boiler as developed by the steam engine 18 is more than ample to operate the air compressor 20, the expander engine 84 as well as the refrigerating unit 26 and the $CO_2$ absorbing and separating unit 30, and, by actual experience, I have found that some power is left over which can be put to any other use such as further refrigeration, or the like.

The refrigerating unit 26 may have a series, or a multiple connection with the refrigerating chambers 54 and 64, it being noted that the inlet pipe 66 of the refrigerating unit 64 communicates with the unit 26 at 67, and that its return pipe 68 communicates again with the unit 26 at 69. Similarly, from the main outlet 67 an inlet pipe 71 leads to the refrigerating chamber 74 and a return pipe 73 communicates with the main return 69, and, by manipulating the valves controlling the refrigerating chambers 54 and 64, can be connected independently or in a series with the refrigerating unit 26.

By the system and apparatus last described I effect very radical economies in the manufacture of solid $CO_2$ as well as liquid air if it is desired to be used as such, or liquid or gaseous oxygen or nitrogen, as desired, and as by products of the consumption of the pre-determined amount of fuel I produce the necessary refrigerants, not only to solidify $CO_2$ from its liquid into its solid state without intermediate evaporation or expansion, but also for pre-cooling the air and thus reducing the power consumption in the manufacture of the liquid or gaseous oxygen or nitrogen.

One ton of 2000 pounds Bunker C No. 6 fuel oil is known to possess a content of about 85% carbon or approximately 1700 pounds. This, when thoroughly combusted will produce about 4500 pounds of $CO_2$. The Girbotol process for the extraction of $CO_2$ from the flue gases of combustion operates on a basis of approximately 85% efficiency so that the $CO_2$ that can be recovered from the combustion gases of the burning of 2000 pounds of the fuel oil mentioned will be about 3800 pounds, and after allowing a generous discount for loss in processing and handling, and if this loss is figured on the basis of 5% or even more, there will still be over 3000 pounds of $CO_2$ ready for the market in the frozen state.

One pound of fuel oil of the type mentioned, used in a boiler of about 85% thermal efficiency will produce 16 pounds of steam at 1500 pounds pressure and 850° F. A triple expansion steam engine develops 1 HPH for each 16 pounds of steam of this pressure and temperature. Therefore, the combustion of 2000 pounds of fuel oil will produce 2000 HPH's. Whether the 2000 pounds are consumed in an hour or 8 hours, for instance, is immaterial since this is only a question of size and capacity and the fact remains that from the combustion of 2000 pounds of fuel 2000 HPH's and 3800 pounds of $CO_2$ gas are produced. Any standard, well known liquid air machine will consume about 1000 HPH's in the making of 1 ton of liquid oxygen. This leaves 1000 HPH's for running the auxiliary machinery involved, such as the compressors, blowers and pumps shown, as well as presses and cutters for handling the solidified $CO_2$ (not shown). The water for the boiler as well as the air for combustion are pre-heated by the flue gases thus not only utilizing the heat but also cooling the gases. The mechanical refrigeration for pre-cooling the air prior to its entry into the compressor, as well as for pre-cooling the $CO_2$ and the separation of the $CO_2$ from the flue gases, are obtained from the exhaust steam of the engine. The mechanical refrigeration pre-cools the air thus lessening the work on the compressors forming part of the liquid air machine and pre-cools the $CO_2$ into the liquid state so that it is solidified at approximately atmospheric pressure by the nitrogen which is distilled from the liquid air machine and which leaves the residue of liquid oxygen. Also, the nitrogen used in solidifying the $CO_2$ in the chamber 50 is by-passed through the conduit 56 to the precooling chamber 46 so that its entire cooling capacity is utilized. The excess HPH's over what is needed to operate the compressors, pumps and blowers referred to, all of which are estimated to utilize about 200 HPH's, can be utilized for the manufacture of water ice of which 5 tons can be made for every 250 HPH's, or for other purposes. Also, the exhaust steam, which is approximately 32,000 pounds at 10 pound pressure and at about 240° F. or 250° F. is more than enough for the production of the desired mechanical refrigeration and separation of $CO_2$ and the excess can be utilized for heating a building or other purposes.

It will be seen that the invention resides in the balanced recovery system by means of which all the available factors are coordinated and profitably utilized in the highest degree of efficiency and economy, and, by means of which, for the cost of one ton of Bunker C No. 6 fuel oil, which is extremely inexpensive, I produce more than 1 ton of liquid oxygen, more than 1 ton of solid carbon dioxide, more than 5 tons of water ice, and have surplus power, steam and refrigeration available either for other use or as a margin.

Having thus described my invention, what I claim as new and desire to secure by Letters Patent is:

1. Apparatus for producing solid carbon dioxide, comprising means for separating carbon dioxide from combustion gases, means for subjecting the carbon dioxide to the refrigerating action of nitrogen at a temperature below minus 105° F., and means for maintaining the carbon dioxide under substantially atmospheric pressure during the process of refrigeration.

2. Apparatus for producing solid carbon dioxide, comprising means for separating carbon dioxide gas from the products of combustion of a steam generator, a refrigerating machine for liquefying said carbon dioxide gas, a liquid air producing machine, and means for subjecting the liquid carbon dioxide to the refrigerating action of liquid air, whereby the liquid carbon dioxide is solidified without any expansion or evaporation of any portion of said carbon dioxide, said carbon dioxide separating means, said refrigerating machine and said liquid air machine being operated by the power produced from said steam generator.

3. Apparatus for producing solid carbon dioxide and liquid air, comprising a steam generator, a mechanism for extracting carbon dioxide gas from the products of combustion of said steam generator, a steam engine adapted to be operated by steam from said steam generator, a refrigerating mechanism, said refrigerating mechanism and said carbon dioxide extracting mechanism being operated by the exhaust steam of said steam engine, an air compressor operated by said steam engine, a liquid air machine coacting with said air compressor for producing liquid air, means leading from said refrigerating mechanism to said air compressor for refrigerating the air and thus facilitating its compression, means communicating with said refrigerating mechanism for liquefying the carbon dioxide, and means for subjecting the liquid carbon dioxide to the refrigerating action of liquid air.

4. The method of producing solid carbon dioxide which consists in separating carbon dioxide gas from the gases of combustion of a steam generator, utilizing the primary steam of said steam generator for actuating an air compressor, utilizing the exhaust steam of said steam engine to operate a refrigerating mechanism, utilizing said refrigerating mechanism to cool the air passing through said compressor and to liquefy the carbon dioxide, producing liquid air by means of said air compressor, and finally subjecting the liquid carbon dioxide to the refrigerating action of the liquid air.

5. The method of producing solid carbon dioxide which consists in separating carbon dioxide gas from the gases of combustion of a steam generator, utilizing the primary steam of said steam generator for actuating an air compressor to produce liquid nitrogen in a liquid air machine, utilizing the exhaust steam of said steam engine to operate a refrigerating mechanism, utilizing said refrigerating mechanism to cool the air passing through said compressor and to liquefy the gas, producing liquid nitrogen from said air machine, and finally subjecting the liquid carbon dioxide to the refrigerating action of said liquid nitrogen.

6. The method of producing solid carbon dioxide which consists in separating carbon dioxide gas from the gases of combustion of a steam generator, utilizing the primary steam of said steam generator for actuating an air compressor, utilizing the exhaust steam of said steam engine to operate a refrigerating mechanism, utilizing said refrigerating mechanism to cool the air passing through said compressor and to liquefy the gas, producing liquid oxygen in a liquid air machine coacting with said air compressor, and finally subjecting the liquid carbon dioxide to the refrigerating action of said liquid oxygen.

JOSEPH F. WINKLER.